United States Patent
Shi et al.

(10) Patent No.: US 12,480,043 B2
(45) Date of Patent: Nov. 25, 2025

(54) RED-LIGHT-MEDIATED NUCLEIC ACID ANCHORING-TYPE FLUORESCENT PROBE, AND PREPARATION METHOD THEREFOR AND USE THEREOF

(71) Applicant: SOOCHOW UNIVERSITY, Suzhou (CN)

(72) Inventors: Haibin Shi, Suzhou (CN); Shuyue Ye, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 460 days.

(21) Appl. No.: 18/037,561

(22) PCT Filed: Nov. 12, 2020

(86) PCT No.: PCT/CN2020/128480
§ 371 (c)(1),
(2) Date: May 17, 2023

(87) PCT Pub. No.: WO2022/099565
PCT Pub. Date: May 19, 2022

(65) Prior Publication Data
US 2023/0407169 A1 Dec. 21, 2023

(51) Int. Cl.
*C07K 1/13* (2006.01)
*C07D 405/14* (2006.01)
*C07K 7/64* (2006.01)
*C09K 11/06* (2006.01)

(52) U.S. Cl.
CPC ............ *C09K 11/06* (2013.01); *C07D 405/14* (2013.01); *C07K 1/13* (2013.01); *C07K 7/64* (2013.01); *C09K 2211/1007* (2013.01); *C09K 2211/1022* (2013.01)

(58) Field of Classification Search
None
See application file for complete search history.

(56) References Cited

U.S. PATENT DOCUMENTS 10,736,932 B2  8/2020  Briesewitz et al.

FOREIGN PATENT DOCUMENTS

| CN | 109180680 A | 1/2019 |
|---|---|---|
| CN | 110684017 A | 1/2020 |
| WO | 2017102246 A1 | 6/2017 |

OTHER PUBLICATIONS

Montes et al., "Photoinduced Cross-Linking of Short Furan-Modified DNA on Surfaces" Langmuir vol. 33 pp. 1197-1201, DOI: 10.1021/acs.langmuir.6b03855 (Year: 2017).*

(Continued)

*Primary Examiner* — Eric Olson
(74) *Attorney, Agent, or Firm* — SZDC Law PC (57) ABSTRACT

The present invention disclosed a red-light-mediated nucleic acid anchoring fluorescent probe and its preparation method and application. The fluorescent probe has the capability of taking a crosslinking reaction with RNA in cytoplasm under singlet oxygen mediation, and imaging of tumor tissues in a long window period is achieved. Moreover, it is found that by means of the probe, after crosslinking of RNA, a severe apoptosis phenomenon of tumor cells occurs, and the integration of diagnosis and treatment of tumors is achieved.

9 Claims, 6 Drawing Sheets

(56) References Cited

OTHER PUBLICATIONS

Schmidt et al., "Structural Basis of Furan-Amino Acid Recognition by a Polyspecific Aminoacyl-tRNA-Synthetase and its Genetic Encoding in Human Cells" ChembioChem Communications vol. 15 pp. 1755-1760, DOI: 10.1002/cbic.201402006 (Year: 2014).*

Hyunjin Kim et al., "Mini-Platform for Off-On Near-Infrared Fluorescence Imaging Using Peptide-Targeting Ligands" Bioconjugate Chem. 2020, 31, 721-728 (Jan. 2, 2020).

Shuyue Ye et al., "Red Light-Initiated Cross-Linking of NIR Probes to Cytoplasmic RNA: An Innovative Strategy for Prolonged Imaging and Unexpected Tumor Suppression" J. Am. Chem. Soc. 2020, 142, 21502-21512 (Dec. 11, 2020).

Julia Eva Mathejczyk et al., "Spectroscopically Well-Characterized RGD Optical Probe as a Prerequisite for Lifetime-Gated Tumor Imaging" Molecular Imaging, vol. 10, No. 6 (Nov.-Dec. 2011): pp. 469-480 (Dec. 31, 2011).

* cited by examiner

RED-LIGHT-MEDIATED NUCLEIC ACID ANCHORING-TYPE FLUORESCENT PROBE, AND PREPARATION METHOD THEREFOR AND USE THEREOF

This application is the National Stage Application of PCT/CN2020/128480, filed on Nov. 12, 2020, which is incorporated by reference for all purposes as if fully set forth herein.

TECHNICAL FIELD

The present invention belongs to the technical field of micromolecule fluorescent probe bioimaging and tumor therapy, in particular to a novel anchoring molecular probe and its preparation method, as well as its application in multimodal imaging and tumor therapy.

BACKGROUND OF INVENTION

As is well known, cancer is one of the major diseases that threaten human life and health, posing a great obstacle to the sound development of the economic society. According to the data released by the National Cancer Center, the incidence rate of tumors in China is increasing year by year and there are more and more younger tumor patients, so it is urgent to develop materials and new technologies for tumor diagnosis and treatment. In recent years, researchers have designed various materials for tumor imaging and treatment, but materials often cannot accumulate in tumor tissues for a long time, which greatly reduces their bioavailability. Therefore, the development of new probes aimed at overcoming hypermetabolism of tumor tissues has significant clinical significance. Biological cross-linking reaction refers to the chemical reaction between compounds and macromolecules in organisms to form covalent bonds under the stimulation of some external conditions.

Technical Problems

In order to overcome the problems of the existing materials and technologies mentioned above, the present invention constructs a novel anchoring molecular probe that utilizes the advantages of its groups of cross-linking ability, good biocompatibility, active targeting integrins and near-infrared emission to carry out longstanding in vivo fluorescence, photoacoustic imaging and tumor treatment.

Technical Solution

The present invention adopts the following technical solution: a novel red-light-mediated nucleic acid anchoring fluorescent probe, which has the following chemical structural formula:

The preparation method of the red-light-mediated nucleic acid anchoring fluorescent probe includes the following steps:

(1) After the deprotection of Boc-Lys (Fmoc)-OH, it reacted with 3-(2-Furyl) propionic acid to obtain the compound 1.

(2) After the compound 1 activated the carboxyl, it reacted with cyclopeptide cRGD to obtain the compound 2 for deprotection to obtain the compound 3.

(3) The compound 3 reacted with Cy 7 SE to obtain the red-light-mediated nucleic acid anchoring fluorescent probe.

The preparation method of the red-light-mediated nucleic acid anchoring fluorescent probe specifically includes the following steps.

(1) After the deprotection of Boc-Lys (Fmoc)-OH in dichloromethane solution containing trifluoroacetic acid, it reacted with 3-(2-Furyl) propionic acid to obtain the compound 1.

(2) After the compound 1 activated the carboxyl by N-hydroxysuccinimide and 1-(3-dimethylaminopropyl)-3-ethylcarbodiimide hydrochloride, it reacted with cyclopeptide cRGD to obtain the compound 2.

(3) The compound 2 deprotected in N,N-dimethylformamide solution containing piperidine to obtain the compound 3.

(4) The compound 3 reacted with Cy 7 SE to obtain the red-light-mediated nucleic acid anchoring fluorescent probe f-CR.

The present invention disclosed a method to anchor cells by a red-light-mediated probe, including the following steps.

(1) After the deprotection of Boc-Lys (Fmoc)-OH, it reacted with 3-(2-Furyl) propionic acid to obtain the compound 1.

(2) After the compound 1 activated the carboxyl, it reacted with cyclopeptide cRGD to obtain the compound 2 for deprotection to obtain the compound 3.

(3) The compound 3 reacted with Cy 7 SE to obtain the red-light-mediated nucleic acid anchoring fluorescent probe.

(4) Co-incubate the red-light-mediated nucleic acid anchoring fluorescent probe, methylene blue, and cells to achieve probe anchoring of cells; and the co-incubation was carried out in the light and in a culture medium, preferably with a molar ratio of the red-light-mediated nucleic acid anchoring fluorescent probe to methylene blue as 100:(0.8-1.2), preferably 100 to 1.

In the above technical solution, Boc-Lys(Fmoc)-OH, trifluoroacetic acid, and 3-(2-Furyl) propionic acid reacted in an organic solvent to obtain the compound 1; the compound 1 reacted with N-hydroxysuccinimide, 1-(3-dimethylaminopropyl)-3-ethylcarbodiimide hydrochloride and cRGD to obtain the compound 2; the compound 2 reacted with piperidine in an organic solvent to obtain the compound 3; the compound 3 reacted with Cy 7 SE in an organic solvent to obtain the anchoring molecular probe f-CR; the molar ratio of Boc-Lys(Fmoc)-OH to 3-(2-Furyl) propionic acid was 1:(1-1.5); preferably, the molar ratio of Boc-Lys(Fmoc)-OH, trifluoroacetic acid and 3-(2-Furyl) propionic acid was 1:10:1.2, the molar ratio of compound 1 to N-hydroxysuccinimide, 1-(3-dimethylaminopropyl)-3-ethylcarbodiimide hydrochloride and cRGD is 1:1.2:1.5:1.1, the molar ratio of compound C-1-4 to piperidine was 1:10, and the molar ratio of the compound 3 to Cy7 SE is 1:1.1.

The present invention disclosed the application of the anchoring molecular probe in the preparation of photoacoustic and fluorescence imaging reagents and tumor suppression.

According to the technical solution of the present invention, in step (1), the reaction of the compound Boc-Lys (Fmoc)-OH and trifluoroacetic acid was carried out in dichloromethane, and the molar ratio of Boc-Lys (Fmoc)-OH to trifluoroacetic acid was 1:10; preferably, the reaction was carried out at room temperature for 0.5 hours.

In step (2), the molar ratio of the compound 1 to cRGD was 1:(1-1.2); Preferably, the reaction of the compound 1 with N-hydroxysuccinimide and 1-(3-dimethylaminopropyl)-3-ethylcarbodiimide hydrochloride was carried out in N,N-dimethylformamide, and the molar ratio of the compound 1 to N-hydroxysuccinimide and 1-(3-dimethylaminopropyl)-3-ethylcarbodiimide hydrochloride was 1:1.2:1.5; Preferably, the reaction was carried out at 0° C. for 0.5 hours and then at room temperature for 2 hours. Subsequently, the cRGD reaction was carried out in N,N-dimethylformamide solvent containing N,N-Diisopropylethylamine, with a molar ratio of cRGD and N,N-Diisopropylethylamine as 1:1.1:1; preferably, the reaction continued at room temperature for 2 hours.

In step (3), the compound 2 reacted with piperidine in N,N-dimethylformamide solvent, with a molar ratio of the compound 2 and piperidine as 1:10; Preferably, the reaction was at room temperature for 0.2 hours.

In step (4), the compound 3 reacted with Cy 7 SE in N,N-dimethylformamide solvent containing N,N-Diisopropylethylamine, with a molar ratio of the compound 3 and Cy 7 SE as 1:(1-1.2); Preferably, the molar ratio of the compound 3, Cy 7 SE and N,N-diisopropylethylamine was 1:1.1:1; Preferably, the reaction was at room temperature for 1 hour.

In step (5), cRGD reacted with Cy 7 SE in N,N-dimethylformamide solvent containing N,N-Diisopropylethylamine, with a molar ratio of cRGD, Cy 7 SE and N,N-Diisopropylethylamine as 1:1.1:1; Preferably, the reaction was at room temperature for 1 hour.

In the present invention, the chemical structural formulas of compound 1, compound 2, compound 3, compound CR, and compound f-CR are as follows:

-continued

The compounds CR and f-CR of the present invention are both in the form of internal salts and are conventional representations in the art.

The present invention disclosed the application of the red-light-mediated nucleic acid anchoring fluorescent probe in prolonging imaging time and tumor suppression in in vivo fluorescence imaging or photoacoustic imaging; alternatively, the application of the novel anchoring molecular probe in the preparation of long-term fluorescence imaging reagents, photoacoustic imaging reagents, or tumor suppression reagents; alternatively, the application of the novel anchoring molecular probe in prolonging fluorescence imaging of tumor cells by cross-linking with RNA in tumor cells; alternatively, the application of the novel anchoring molecular probe cross-linking with RNA in the of tumor cell to inhibit the growth of tumor cells.

Beneficial Effects

Due to the application of the above-described technical solution, the present invention has the following advantages in comparison with the prior art:

(1) A novel anchoring molecular probe f-CR has been designed and synthesized in the present invention to perform long-term in vivo fluorescence and photoacoustic imaging under singlet oxygen generated under red-light mediation.

(2) The target probe in the present invention can undergo cross-linking reaction with RNA in cells under singlet oxygen generated under red-light mediation, thereby prolonging the residence time of the probe molecules in the cells.

(3) The target probe in the present invention has a good ability to promote apoptosis of tumor cells after cross-linking with RNA in tumor cells.

(4) The target probe in the present invention has an ability to inhibit tumor growth in tumor-bearing mice after in vivo cross-linking reaction.

BRIEF DESCRIPTION OF THE DRAWINGS

FIG. 6 shows (a) the cytotoxicity changes after co-incubation of the probe f-CR in the experimental group and the probe CR in the control group with MB and 4T1 cells for 12 hours, respectively; (b) the cytotoxicity changes after co-incubation of the probe f-CR in the experimental group and the probe CR in the control group with MB and 4T1 cells for 12 hours, respectively and then exposed to illumination (660 nm, 50 mW/cm², 3 min); (c) observe the apoptosis changes with live-dead and bright field respectively after co-incubation of the probe f-CR in the experimental group and the probe CR in the control group with MB and 4T1 cells for 12 hours, respectively and then exposed to illumination (660 nm, 50 mW/cm², 3 min); (d) GFP mRNA was transfected into 4T1 cells after in vitro cross-linking reaction with the probe f-CR in the experimental group and the probe CR in the control group and the expression of GFP was observed by confocal, and the expression of GFP was observed by flow cytometry (e); (f) Mechanism diagram of cell apoptosis.

EMBODIMENT OF THE PRESENT INVENTION

The present invention is further elaborated with the accompanying drawings and specific embodiments. It should be understood that these embodiments are only used to explain and illustrate the technical solutions in the present invention, and are not intended to limit the scope of the present invention. In addition, unless otherwise specified, the materials, reagents, instruments, etc. used in the following embodiments can be obtained through commercial means; and the specific preparation and testing methods are conventional methods in the art.

The steps for constructing and synthesizing the integrated tumor-anchoring diagnosis and treatment in the present invention are as follows: After the deprotection of Boc-Lys (Fmoc)-OH in dichloromethane solution containing trifluoroacetic acid, it reacted with 3-(2-Furyl) propionic acid to obtain the compound 1, and after the compound 1 activated the carboxyl by N-hydroxysuccinimide and 1-(3-dimethylaminopropyl)-3-ethylcarbodiimide hydrochloride, it reacted with cyclopeptide cRGD to obtain the compound 2, and the compound 2 deprotected in N,N-dimethylformamide solution containing piperidine to obtain the compound 3, and the compound 3 reacted with Cy 7 SE to obtain the anchoring molecular probe f-CR.

The cyclopeptide cRGD reacted with Cy 7 SE to obtain the probe CR in the control group.

The method of using the novel anchoring molecular probe for long-term fluorescence in vivo imaging includes the following steps: first, methylene blue (MB) was pre-injected into the tumor, and then the aqueous solution of the novel anchoring molecular probe f-CR and the control group CR was tail-vein injected into the tumor-bearing mice to observe the in vivo fluorescence and photoacoustic imaging effects at different timings under anesthesia.

Using the aqueous solution of the novel anchoring molecular probe f-CR and the control group CR to co-incubate them with tumor cells respectively and observe the fluorescence intensity inside the tumor cells at different time points.

Using the aqueous solution of the novel anchoring molecular probe f-CR and the control group CR to co-incubate them with tumor cells respectively for 48 hours and then observe the apoptosis of tumor cells.

The method of using the novel anchoring molecular probe for in vivo tumor suppression experiments includes the following steps: first, methylene blue was pre-injected into the tumor, and then the aqueous solution of the novel anchoring molecular probe f-CR and the control group CR was tail-vein injected into the tumor-bearing mice to continuously observe and record the tumor suppression under illumination in an hour.

(1) The in vivo fluorescence imaging of the novel probe in the integrated tumor anchoring diagnosis and treatment: First, MB (concentration: 0.1 μM. volume: 50 μL) was injected into the tumor and after 0.5 hours, the obtained experimental group probe f-CR and control group probe CR was dissolved in PBS solution (concentration: 100 μM. Volume: 200 μL) respectively, and the probes were injected into the BALB/c female tumor-bearing mice (4T1 mice breast cancer) by tail vein, and then placed in a small animal in vivo optical imaging system/IVIS Spectrum (PerkinElmer), and after 1 hour, the tumor sites were illuminated (660 nm 50 mW/cm² for 3 minutes) to observe the imaging effect in real time. Finally, the fluorescence intensity of the tumor sites in mice at different time points was calculated by the in vivo imaging analysis software.

(2) The in vivo photoacoustic imaging of the novel probe in the integrated tumor anchoring diagnosis and treatment: First, MB (concentration: 0.1 μM. volume: 50 μL) was injected into the tumor and after 0.5 hours, the obtained experimental group probe f-CR and control group probe CR was dissolved in PBS solution (concentration: 100 μM. Volume: 200 μL) respectively, and then the probes were injected into the BALB/c female tumor-bearing mice (4T1 mice breast cancer) by tail vein, and at the same time, the small animal photoacoustic tomography imaging system was turned on, and then anesthetized mice were put into the water bath when the water temperature in the water bath of the photoacoustic imaging device reached 37° C., and then the tumor sites of the mice were scanned. After 1 hour, the tumor sites were illuminated (660 nm 50 mW/cm 2 for 3 minutes) to observe the imaging effect in real time. Finally, the fluorescence intensity of the tumor sites in mice at different time points was calculated by the in vivo imaging analysis software. Afterwards, the obtained photoacoustic imaging data was reconstructed and analyzed using MSOT InSight/inVision analysis software.

(3) The tumor inhibition experiment of the novel probe in the integrated tumor anchoring diagnosis and treatment: The BALB/c female mice (tumor volume of about 20 mm 3) bearing tumors on both sides of the back (4T1 mice breast cancer) were randomly divided into three groups (n=5): tail vein injection of PBS (10 mM, 200 μL) for the left tumor of mice (Group 1, abbreviated as PBS), right tumor treated with 660 nm laser irradiation (Group 2, abbreviated as PBS+660 nm); only tail vein injection of CR (200 μM, 200 μL) and pre-injection of MB (concentration: 0.1 μM. volume: 50 μL) into the tumor for the left tumor (Group 3, abbreviated as CR+MB), pre-injection of MB (concentration: 0.1 μM, volume: 50 μL) to the right tumor and treated with 660 nm laser irradiation (Group 4, abbreviated as CR+MB+660 nm); tail vein injection of f-CR (200 μM, 200 μL) and pre-injection of MB (concentration: 0.1 μM. volume: 50 μL) into the tumor for the left tumor (Group 3, abbreviated as f-CR+MB), pre-injection of MB (concentration: 0.1 μM, volume: 50 μL) to the right tumor and treated with 660 nm laser irradiation (Group 4, abbreviated as f-CR+MB+660 nm). After treatment, the tumor volume changes in mice were recorded every other day and the survival rate curve of the mice was plotted.

Embodiment 1: Synthesis of the Novel Probe CR and f-CR in the Integrated Tumor Anchoring Diagnosis and Treatment Synthetic compound 1: Boc Lys (Fmoc)-OH (0.5 g, 1.07 mmol) was dissolved in 10 mL of dichloromethane and 2 mL of trifluoroacetic acid was added and stirred for 10 minutes at room temperature to remove BOC and collect the product, and then 3-(2-Furyl) propionic acid (0.2 g, 1.43 mmol), 1-(3-dimethylaminopropyl)-3-ethylcarbodiimide hydrochloride (0.82 g, 1.43 mmol) and N-hydroxysuccinimide (0.2 g, 1.71 mmol) were added and stirred at room temperature for 4 h, and then N,N-Diisopropylethylamine (5 μL) was added to continue the reaction for 3 hours. After the reaction, extract three times with ethyl acetate before concentration, and then elute with silica gel column to obtain pure product compound 1 (0.56 g, 80%). $C_{28}H_{30}N_2O_6$ ([M+H]$^+$): 489.2021, found ESI-MS: m/z 489.2031; Synthesis of compound 2: cRGD (10 mg, 16.57 μmol) and 1 (19.47 mg, 33.13 μmol) was dissolved in DMF (5 mL) and stirred at 0° C. for 10 minutes and then DIPEA (2 μL) was slowly added. After reacting at room temperature for two hours, the product was collected and separated by the preparative HPLC to obtain product compound 2 $C_{55}H_{69}N_{11}O_{12}$ ([M–H]$^-$): 1076.5190, found ESI-MS: m/z 1076.5187; Synthesis of compound 3: the compound 2 (10 mg, 9.29 μmol) was dissolved in DMF/diethylamine (6 mL, 5:1, v/v) solution for reaction for 1 hour at room temperature. After concentrating the crude product, the product was collected and separated by the preparative HPLC to obtain product compound 3 $C_{40}H_{59}N_{11}O_{10}$ ([M–H]$^-$): 852.4374, found ESI-MS: m/z 852.4370; Synthesis of compound f-CR: the compound 3 (5 mg, 5.86 μmol), Cy7-SE (4.24 mg, 5.86 μmol) was dissolved in DMF (2 mL) and stirred at 0° C. for 10 minutes while added dropwise to the reaction system. Then restore to room temperature and continue the reaction for 2 hours before separating the sample by the preparative HPLC to obtain the final product. $C_{75}H_{99}N_{13}O_{17}S_2$ ([M–H]$^-$): 1516.6651, found ESI-MS: m/z 1516.6664.

Synthesis of the control group compound CR: cRGD (5 mg, 8.27 μmol), Cy7-SE (5.99 mg, 8.27 μmol) was dissolve in DMF (2 mL) and DIPEA was slowly added and stirred at 0° C. for 10 minutes. Then restore to room temperature and continue stirring for 2 hours to collect the crude product to be separated by the preparative HPLC to obtain the control group product. $C_{62}H_{81}N_{11}O_{14}S_2$ ([M–H]$^-$): 1266.5339, found ESI-MS: m/z 1266.5321.

Figure 1:
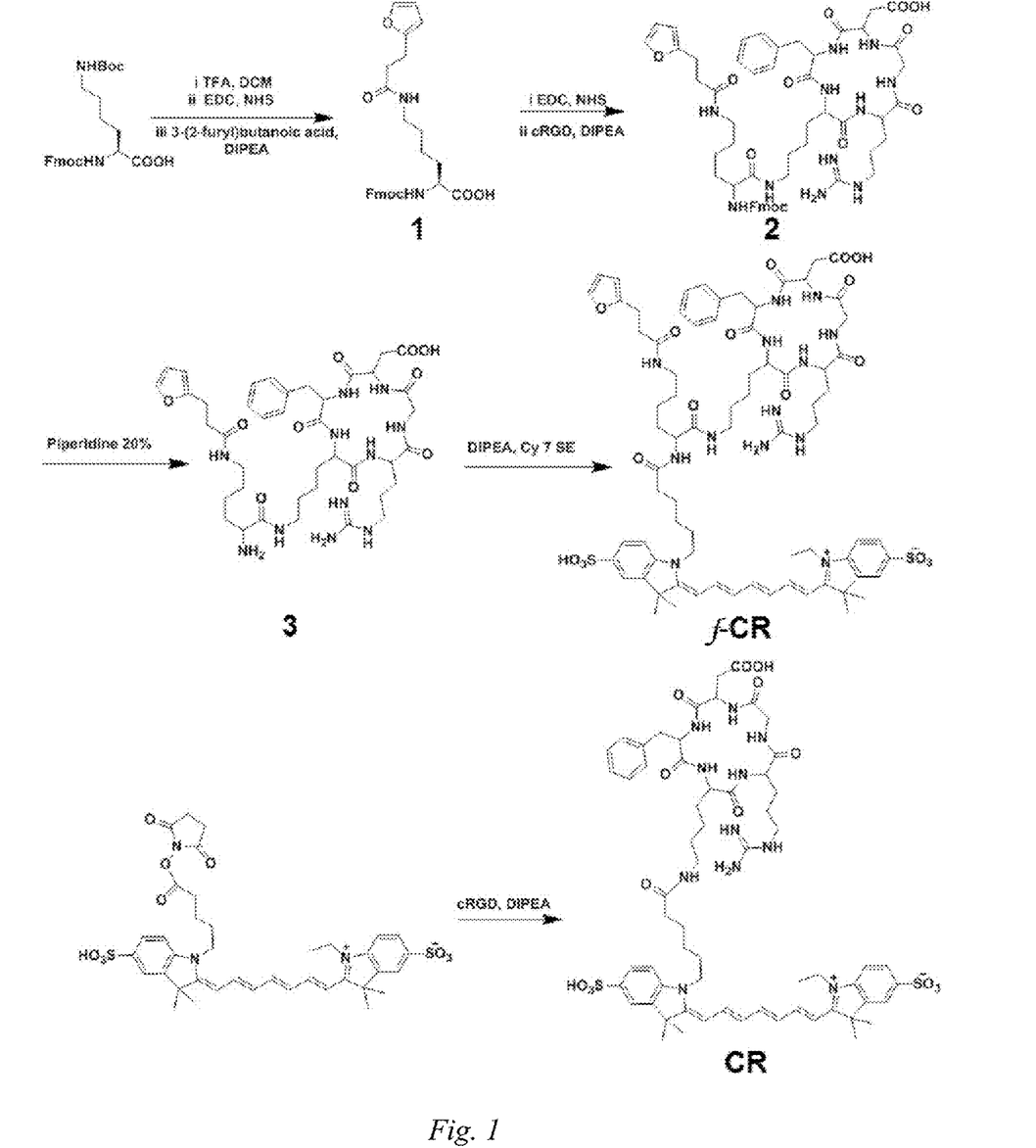
FIG. 1 is a schematic diagram of the synthesis of a novel anchoring molecular probe in the embodiment 1.

The schematic diagram of the above reaction and the chemical structural formulas of various products are shown in FIG. 1.

Figure 2:
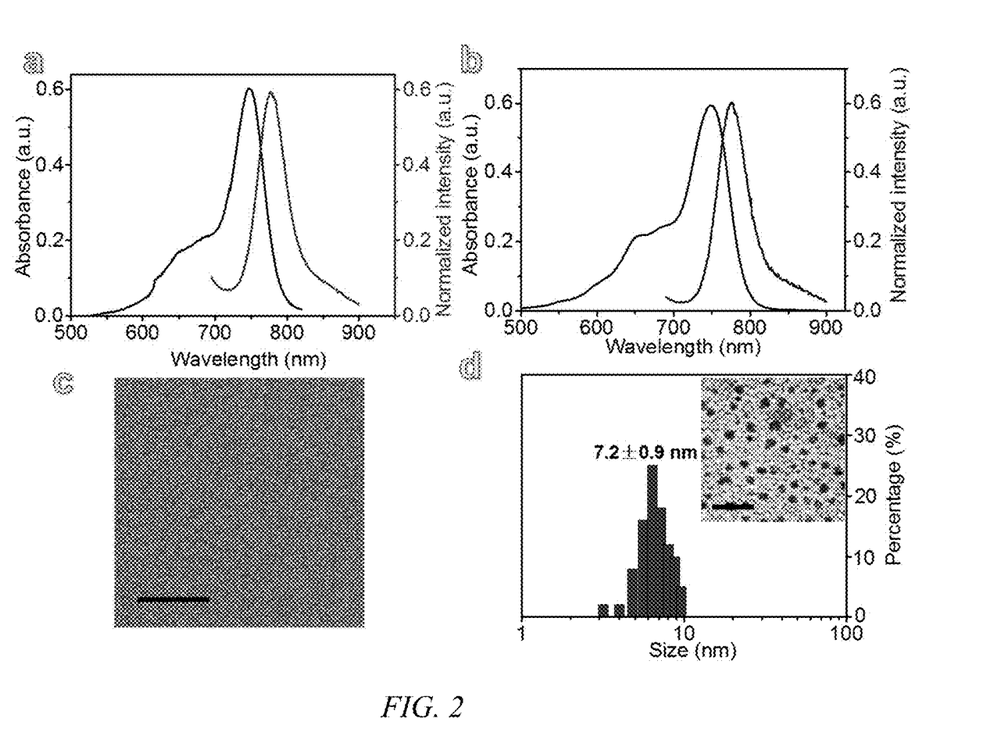
FIG. 2 shows (a) the chemical structures of the probe f-CR in the experimental group and the probe CR in the control group; (b) UV absorption and fluorescence emission images of the probe f-CR in the experimental group in aqueous solution; (c) TEM and particle size statistical data of the probe f-CR in the experimental group in aqueous solution in the embodiment 2.

Embodiment 2: Physical and chemical properties of the novel probe in the integrated tumor anchoring diagnosis and treatment: Dilute the control group probe CR and experimental group probe f-CR prepared in Embodiment 1 with ultrapure water to a concentration of 10 μM (completely soluble), and its UV visible near-infrared and fluorescence spectra were measured using a UV visible near-infrared spectrophotometer and a fluorescence spectrophotometer. As shown in FIG. 2 (a) (b), the results show that the maximum absorption of probe CR and f-CR was at 747 nm, and the maximum emission was at 789 nm; At the same time, no assembly or nanostructure was found in the control group probe, while the experimental group probe was found to be assembled into a nanostructure with a size greater than about 7.2±0.9 nm, as shown in FIG. 2 (c) (d).

Figure 3:
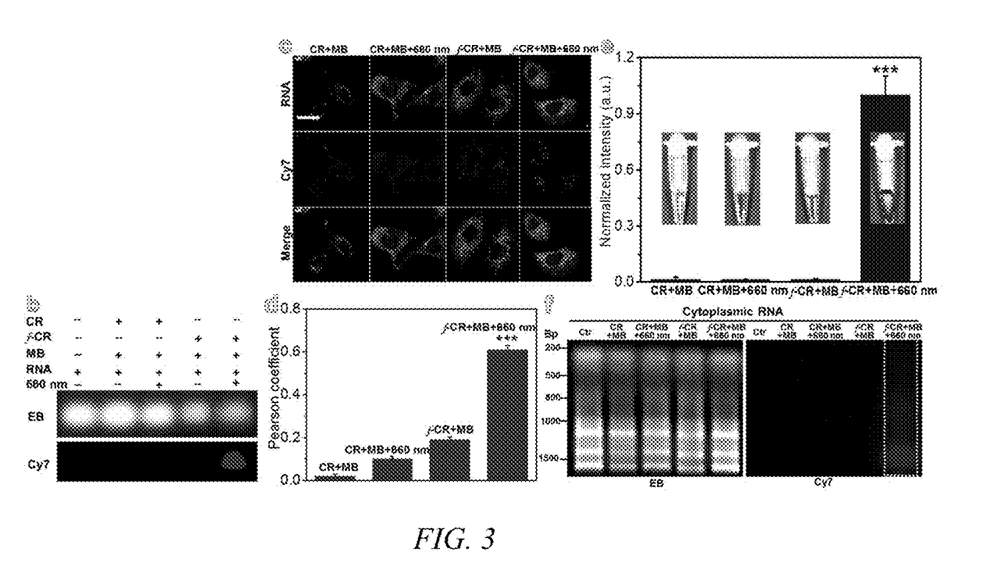
FIG. 3 shows (b) the gel electrophoresis diagram of RNA cross-linking reaction with f-CR; (c) confocal images and co-localization rates (d) of reincubated RNA Select 6 hours after incubation of the probe f-CR in the experimental group and the probe CR in the control group with 4T1 cells respectively; (e) fluorescence and quantitative images of total RNA of cells extracted by total RNA extraction kit; (f) gel electrophoresis diagram of total cytoplasmic RNA extracted by the cell nucleus & cytoplasm RNA extraction kit.

Dilute the control group probe CR and experimental group probe f-CR prepared in Embodiment 1 with ultrapure water to a concentration of 10 μM. Add custom sequence RNA (5'-ACAUCGGGAUAGCGAAGUUGAGAGGAGG-3') 5 μM and MB 10 μM to be mixed and vibrated at 4° C., illuminated at 660 nm (50 mW/cm$^2$, 10 minutes) or not illuminated (shaded). And the reaction solution was separated with RNA nondenaturing gel electrophoresis directly. As shown in FIG. 3b, it can be found that the probe f-CR in the experimental group can be marked with RNA obviously after RNA, MB and illumination were used, while the other groups have no obvious red fluorescence of Cy7. In addition, the control group probe CR and the experimental group probe f-CR were added to the culture medium (HyClone DMEM high sugar liquid medium containing 10% FBS) with a concentration of 10 μM, and 0.1 μM of MB was added, then they were added to 4T1 cells for culture for 6 hours and subjected to 660 nm illumination (50 mW/cm$^2$, 10 minutes) or no illumination (shaded). Subsequently, commercial RNA dye SYTO™ RNASelect™ Green fluorescent cell stains (Thermo Fisher) was used to be stained respectively as shown in FIG. 3d. In the co-localization experiment of the probes, it was found that the co-localization rate in the experimental group (f-CR+MB+660 nm) was higher than that in other groups; Subsequently, the total RNA in the cells was extracted by the Trizol method, and fluorescence quantification revealed that the fluorescence intensity of the experimental group (f-CR+MB+660 nm) was much higher than that of the other groups, as shown in FIG. 3e; Subsequently, cytoplasmic RNA was extracted by the cell nucleus & cytoplasm RNA extraction ki, and the RNA nondenaturing gel analysis revealed that the experimental group (f-CR+MB+660 nm) exhibited obvious red fluorescence, while the other groups did not exhibit obvious fluorescence, as shown in FIG. 3f.

Figure 4:
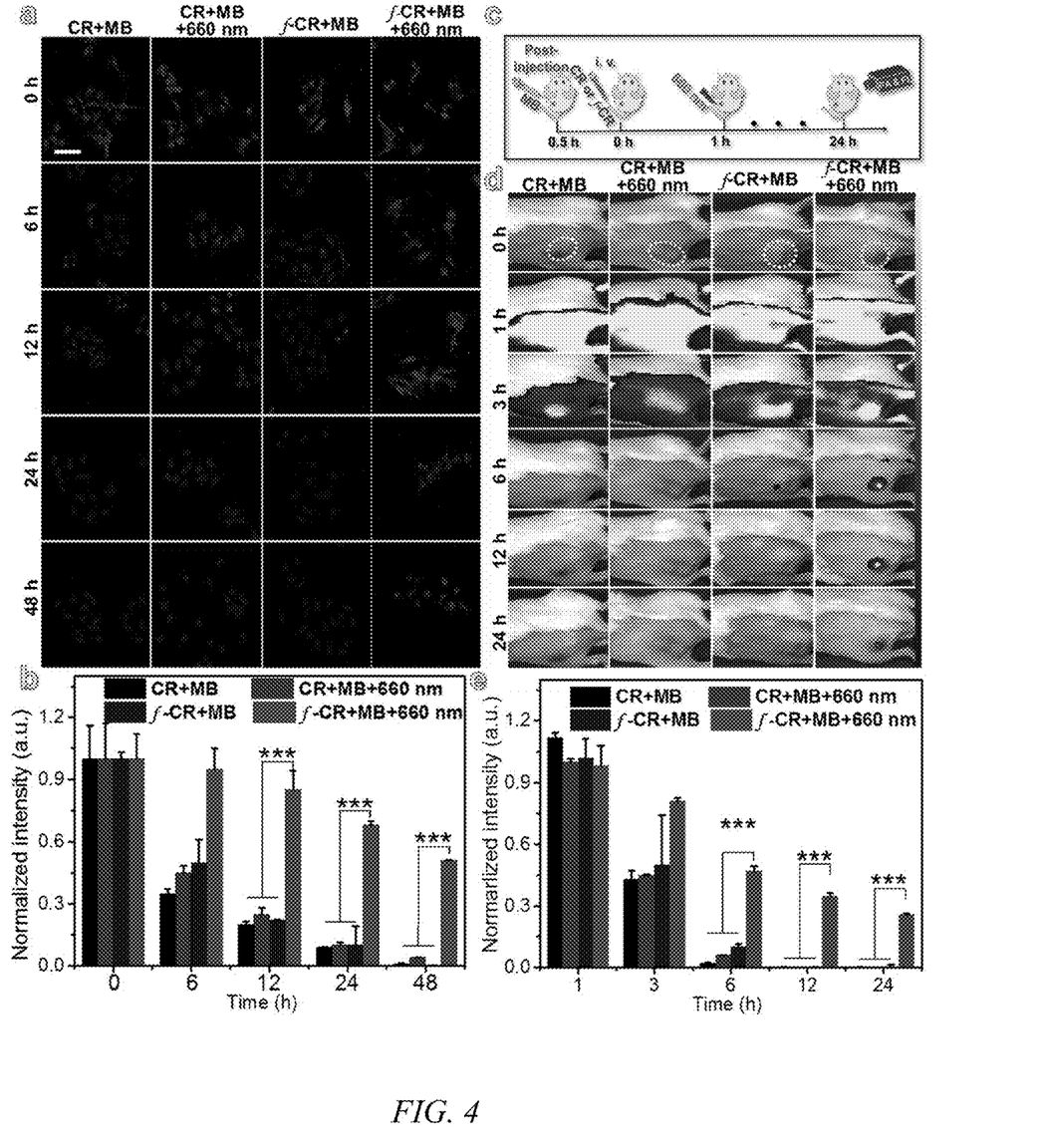
FIG. 4 shows (a) the retention change and fluorescence intensity quantification (b) of the probes in the cells observed through confocal images of illumination 6 hours after the incubations of the probe f-CR in the experimental group and the probe CR in the control group with MB and 4T1 cells respectively; (c) schematic diagram of animal experiments; (d) the retention change and fluorescence intensity quantification (e) of the probes in tumor tissues observed under illumination one hour after the first injecting MB into the tumor and tail-vein injecting the probe f-CR in the experimental group and the probe CR in the control group.

The control group probe CR and the experimental group probe f-CR were added to the culture medium (HyClone DMEM high sugar liquid medium containing 10% FBS) with a concentration of 10 μM, and 0.1 μM of MB was added, then they were added to 4T1 cells for culture for 6 hours and subjected to 660 nm illumination (50 mW/cm$^2$, 10 minutes) or no illumination (shaded) to observe the retention of materials within the cells. It was found that the retention time of the experimental group (f-CR+MB+660 nm) was much longer than that in other groups, as shown in FIGS. 4a and 4b; Subsequently, the retention experiment of the probe in mouse tumors was investigated. The control group probe CR and the experimental group probe f-CR were treated with PBS to a concentration of 100 Mm 200 μL. MB (PBS, 0.1) was injected into the mouse tumor 0.5 hours in advance by intratumor injection, followed by tail vein injection of CR or f-CR. After 1 hour, they were subjected to 660 nm illumination (50 mW/cm$^2$, 3 minutes) or no illumination (shaded) and the metabolic status of the probe in the tumor at different time points was observed through IVIS, as shown in FIGS. 4c, 4d, and 4e. It was found that the retention time of the experimental group (f-CR+MB+660 nm) in vivo was much longer than that of other groups.

Figure 5:
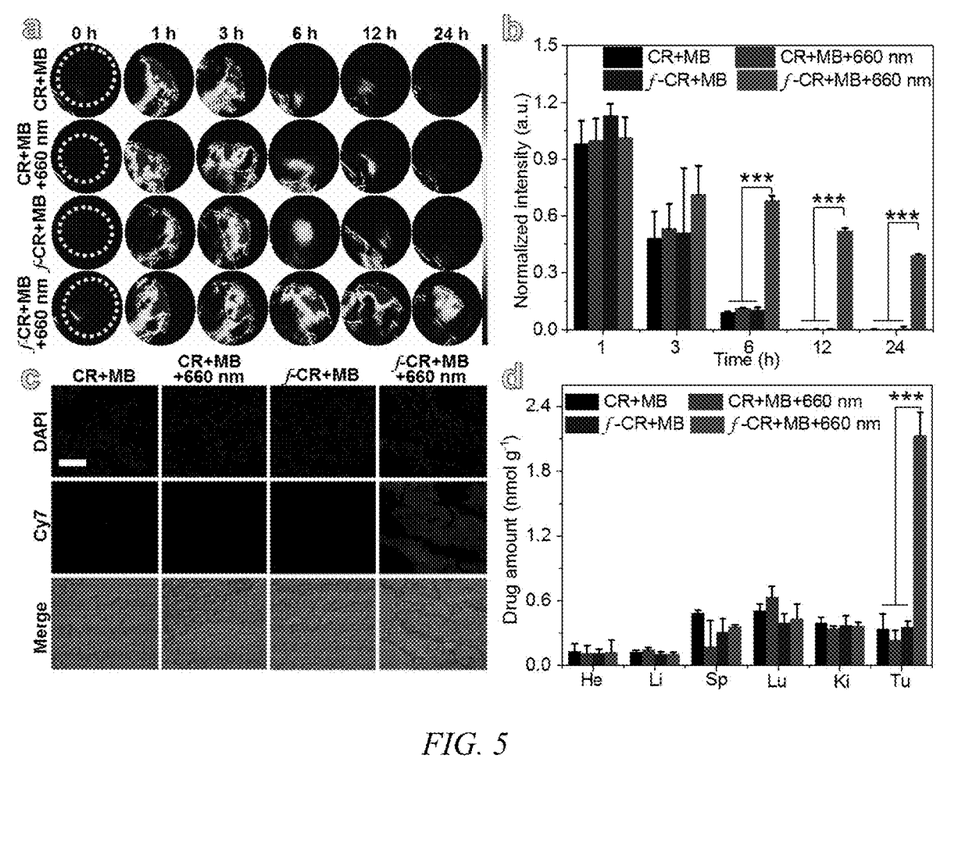
FIG. 5 shows (a) photoacoustic signal change and photoacoustic intensity quantification (b) in the tumor of the probe f-CR in the experimental group and the probe CR in the control group under the same experimental conditions; (c) the enrichment amount of tumor tissues of sectioned materials of in vitro tissues; (d) probe quantification of in vitro tissues (heart, liver, spleen, lung, kidney, tumor).

The control group probe CR and the experimental group probe f-CR were treated with PBS to a concentration of 100 Mm 200 μL. MB (PBS, 0.1) was injected into the mouse tumor 0.5 hours in advance by intratumor injection, followed by tail vein injection of CR or f-CR. After 1 hour, they were subjected to 660 nm illumination (50 mW/cm$^2$, 3 minutes) or no illumination (shaded) and simultaneously the changes in photoacoustic signals at various time points were observed through a photoacoustic imaging system, and the photoacoustic imaging data was reconstructed and analyzed using MSOT InSight/inVision analysis software. It was found that compared to the other groups, the experimental group (f-CR+MB+660 nm) had long-term photoacoustic signals, as shown in FIGS. 5a and 5b; Using the same experimental method as above, after 12 hours of probe injection, the main organs of the mice were taken out, and the tumor tissues were frozen and sectioned as shown in FIG. 5c and quantitative fluorescence intensity of all organ tissue homogenates as shown in FIG. 5d were obtained. It was found that the enrichment of the experimental group (f-CR+MB+660 nm) in the tumor was much higher than that of other groups.

Figure 6:
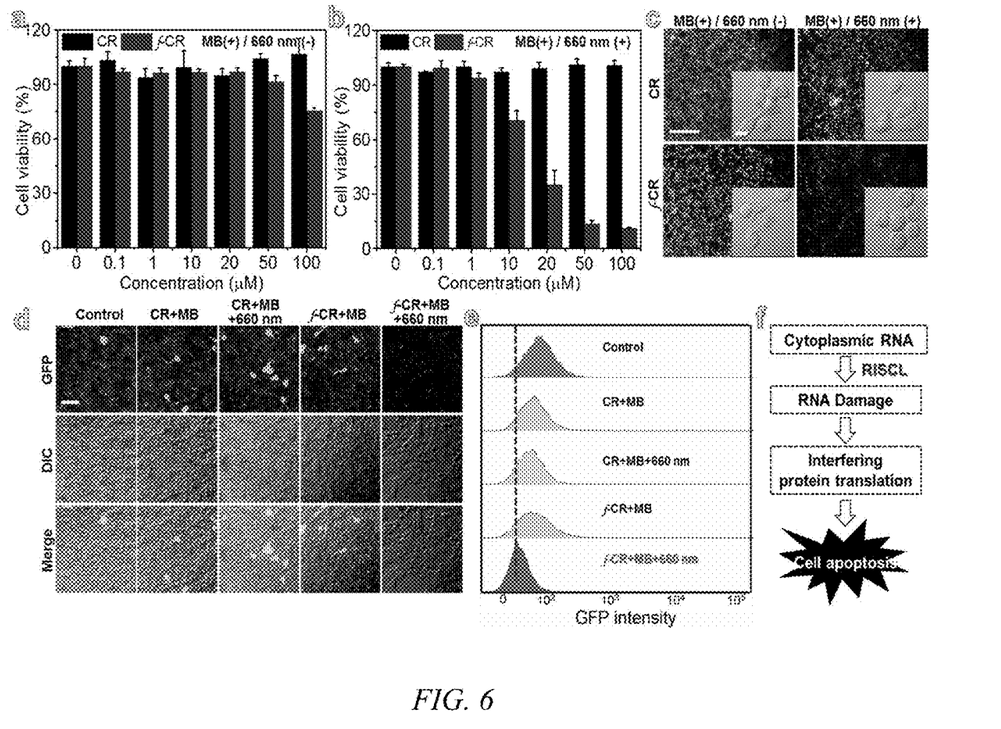

The control group probe CR and experimental group probe f-CR were diluted with culture medium (HyClone DMEM high sugar liquid medium containing 10% FBS) to concentrations of 100, 50, 20, 10, 1, 0.1 μM and 0.1 μM of MB was added, then they were added to 4T1 cells for 12 hours respectively, and it was found that neither CR nor f-CR showed significant toxicity, as shown in FIG. 6a. Under the same experimental conditions, after being exposed to 660 nm illumination (50 mW/cm 2, 3 minutes) and further cultured for 48 hours, it was found that the experimental group (f-CR+MB+660 nm) exhibited certain cytotoxicity, as shown in FIG. 6b; at the same time, the experimental group (f-CR+MB+660 nm) showed the ability to induce tumor cell apoptosis through the Live-dead reagent and the morphology of the cell bright field.

2 μM of commercial GFP-mRNA was used and the control group probe CR and experimental group probe f-CR were diluted with PBS to a concentration of 10 μM and 0.1 μM of MB was added to be regularly oscillated at 4° C. respectively and they were simultaneously subjected to 660 nm illumination (50 mW/cm², 3 minutes) or no illumination (shaded) and subsequently, each mixed solution was transfected into the cells using a liposome transfection kit and cultured for 24 hours. The experimental group (f-CR+MB+ 660 nm) showed a significant decrease in GFP expression in the cells under confocal images, as shown in FIG. 6d, and the experimental group (f-CR+MB+660 nm) showed a decrease in GFP expression through the analysis with flow cytometer, as shown in FIG. 6e.

Figure 7:
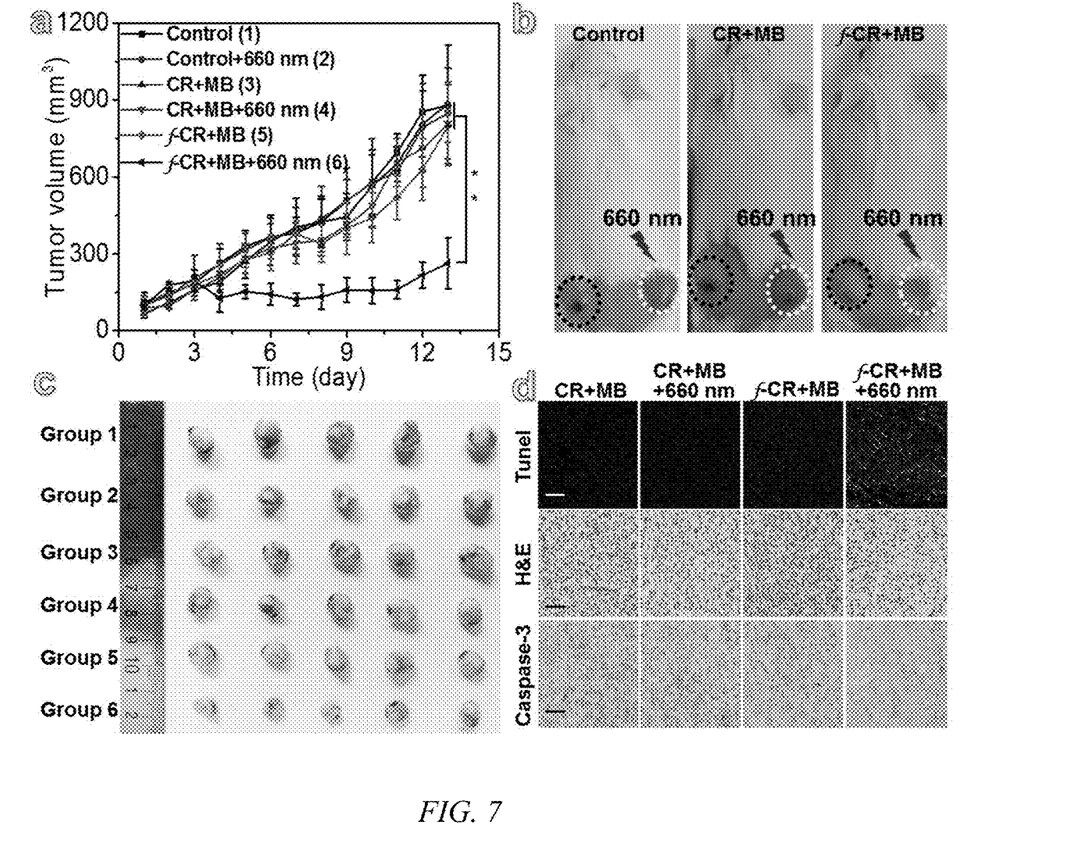
FIG. 7 shows (a) the change curves of tumor inhibition by the probe f-CR in the experimental group and the probe CR in the control group and blank group PBS respectively for 13 days continuously; (b) Comparative sizes of tumors on the back of mice on the 13th day; (c) the sizes of in vitro tumors on the 13th day; (d) the observation of the changes of Tunel, H&E, and Caspase 3 respectively through immunofluorescence and immunohistochemistry 48 hours after treatment.

Tumor inhibition experiment: the control group probe CR and experimental group probe f-CR were diluted with PBS to a concentration of 200 μM 200 μL. MB (PBS, 0.1 μM 50 μL) was injected into the mouse tumor 0.5 hours in advance by intratumor injection, followed by tail vein injection of CR or f-CR. After 1 hour, they were subjected to 660 nm illumination (50 mW/cm², 3 minutes) or no illumination (shaded) and subsequently, the tumor size was measured daily as shown in FIG. 7a. On the thirteenth day, the mice were euthanized as shown in FIG. 7b, and the tumor was removed as shown in FIG. 7c. It was found the experimental group (f-CR+MB+660 nm) had good tumor inhibition ability, and under the same conditions, the mouse tumors were taken on the first day for immunohistochemistry and immunofluorescence analysis of H&E, Tunnel, and Caspase-3 and the probe in the experimental group (f-CR+MB+660 nm) could cause apoptosis and necrosis of tumor tissues.

The anchoring molecular probe of the present invention utilizes red-light-mediated biological cross-linking to improve the retention time of molecules in tumor tissues and inhibit tumor growth. By observing the metabolism of the probes within the tumors at different time points through IVIS, it was found that the retention time of the experimental group (f-CR+MB+660 nm) in vivo was much longer than that of other groups.

The invention claimed is:
1. A red-light-mediated nucleic acid anchoring fluorescent probe, comprising following chemical structural:

2. A method of preparing the red-light-mediated nucleic acid anchoring fluorescent probe of claim 1, comprising: (1) deprotecting Boc-Lys (Fmoc)-OH and reacting with 3-(2-Furyl) propionic acid to obtain a compound 1;

(2) activating a carboxyl of the compound 1, reacting with cyclopeptide cRGD to obtain a compound 2, deprotecting to obtain a compound 3; and
(3) reacting the compound 3 with Cy 7 SE to obtain the red-light-mediated nucleic acid anchoring fluorescent probe.

3. The method of claim 2, wherein deprotecting Boc-Lys (Fmoc)-OH is conducting in a dichloromethane solution containing trifluoroacetic acid; the carboxyl of the compound 1 is activated by N-hydroxysuccinimide and 1-(3-dimethylaminopropyl)-3-ethylcarbodiimide hydrochloride.

4. The method of claim 2, wherein in step (1), a molar ratio of Boc-Lys(Fmoc)-OH to 3-(2-Furyl) propionic acid is 1:(1-1.5); and the reaction of step (1) is carried out at room temperature.

5. The method of claim 2, wherein in step (2), a molar ratio of the compound 1 to cRGD is 1:(1-1.2); the reaction of step (2) is carried out at room temperature.

6. The method of claim 2, wherein in step (3), the compound 3 reacts with Cy 7 SE in an N,N-dimethylformamide solvent containing N,N-diisopropylethylamine, and a molar ratio of the compound 3 to Cy 7 SE is 1:(1-1.2).

7. A method to anchor cells by a red-light-mediated nucleic acid anchoring fluorescent probe, comprising following steps;

(1) deprotecting Boc-Lys(Fmoc)-OH and reacting with 3-(2-Furyl) propionic acid to obtain a compound 1;

(2) activating a carboxyl of the compound 1, reacting with cyclopeptide cRGD to obtain a compound 2, deprotecting to obtain a compound 3;

(3) reacting the compound 3 with Cy 7 SE to obtain the red-light-mediated nucleic acid anchoring fluorescent probe; and (4) co-incubating the red-light-mediated nucleic acid anchoring fluorescent probe, methylene blue, and the cells to achieve probe anchoring of the cells.

8. The method of claim 7, wherein co-incubating is carried out under light and in a culture medium.

9. The method of claim 7, wherein a molar ratio of the red-light-mediated nucleic acid anchoring fluorescent probe to methylene blue as 100:(0.8-1.2).

* * * * *